Oct. 4, 1932.                J. BLACKBURN                 1,880,193
                       GUY WIRE CLAMP AND CONNECTION
                       Filed Feb. 17, 1932      2 Sheets-Sheet 1
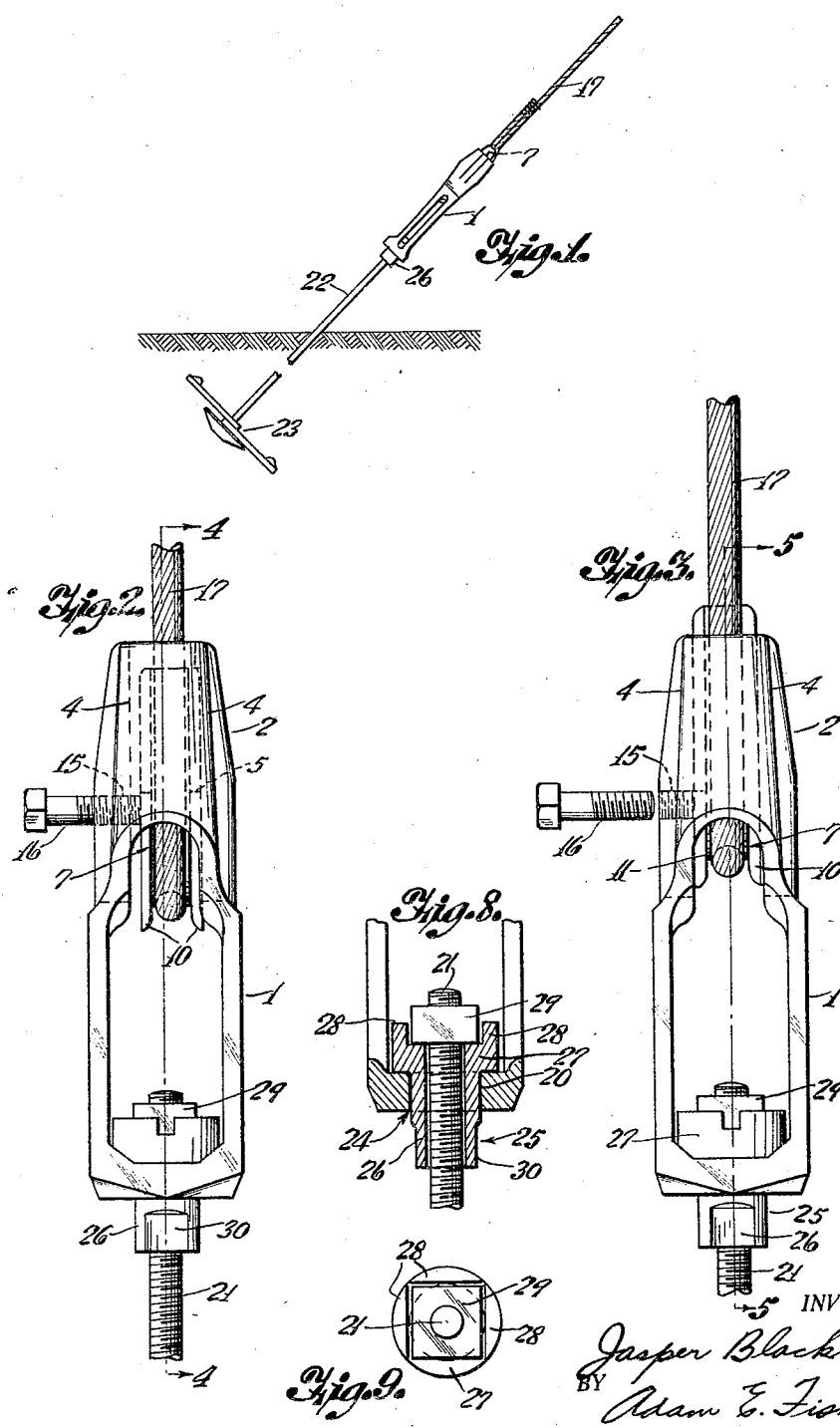
INVENTOR.
Jasper Blackburn
BY Adam E. Fisher
                                                        ATTORNEY.

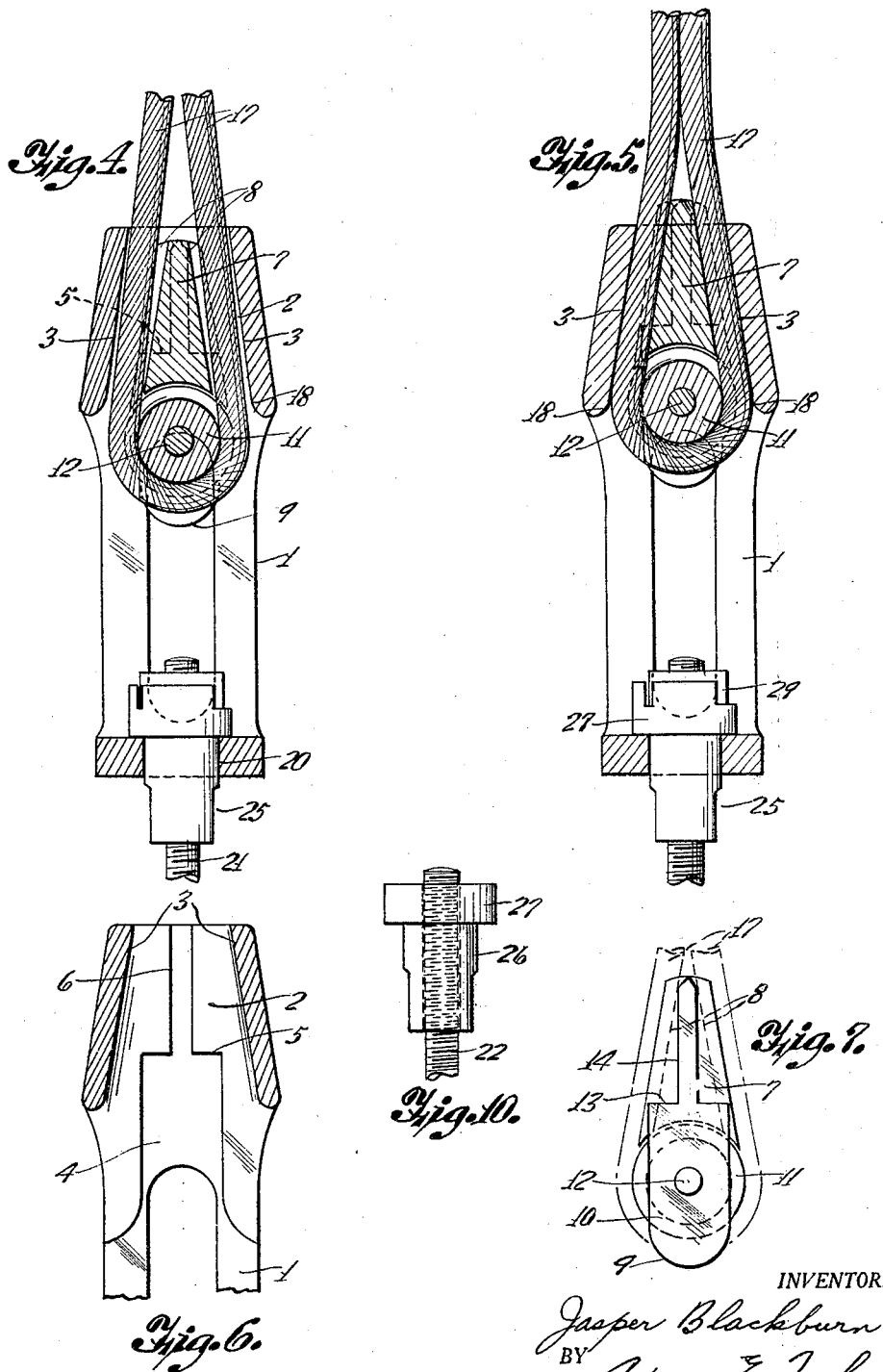

Patented Oct. 4, 1932

1,880,193

UNITED STATES PATENT OFFICE

JASPER BLACKBURN, OF WEBSTER GROVES, MISSOURI

GUY WIRE CLAMP AND CONNECTION

Application filed February 17, 1932. Serial No. 593,517.

This invention pertains to improvements in guy wire clamps and connections, as ordinarily employed upon the anchor cables or guy wires of telephone and telegraph poles, or other similar installation.

One of the principal objects of my present invention is to provide in combination a frame or cage carrying at one end an improved form of guy wire clamp and at the opposite end an improved form of anchor rod connection, the two cooperating to expedite the work of the lineman in adjusting and tightening up the said guy wires or cables.

Another object is to provide, in combination, a frame or cage embodying at one end a tapered sheave socket opening out through the end, a complementary, wedge-shaped sheave block fitted to the said socket, the said block being recessed at its larger end so as to provide spaced bearings, a pulley journaled between said bearings, the opposite end of the frame being apertured for engaging the threaded end of the anchor rod having a nut positioned within the frame, and means extended exteriorly through said aperture for manipulating said nut, whereby the guy wire at one end and the anchor rod at the other may be quickly adjusted, the connecting frame supporting the elements at each end in cooperative relation for such purpose.

Another object is to provide in combination in a device of the kind described a frame embodying at one end a tapered sheave socket, the narrower end of the socket opening out through one end of the frame, a complementary, wedge shaped and grooved sheave block fitted to the said socket, the said block being recessed at its larger end so as to provide spaced bearings, a grooved pulley journaled between said bearings, the arrangement being such that the extended edge lines of the wedge shaped sheave block will lie tangent to the said pulley and so that the latter would constitute substantially a symmetrically enlarged continuation of the sheave block, and means for releasably locking the said sheave block in a retracted position relative to its socket.

Another object is to provide in combination in a device of the kind described a frame or cage having an aperture at one end for receiving an end of the threaded anchor rod and a nut assembly mounted upon said threaded end of the anchor rod and lying partly within the frame and partly without the frame, the interior parts being expanded laterally to bear upon the margins of the aperture and the exterior parts being adapted for gripping with a tool for the purpose of turning the nut assembly upon the anchor rod.

With the foregoing objects and advantages in view, together with such additional objects and advantages as may appear in the course of the following specification, attention is directed to the accompanying drawings as constituting a part of the specification. The figures are all substantially on the same scale, with the exception of Figure 1, which is greatly reduced.

Figure 1 is an elevation showing my invention as employed for connecting a guy wire and anchor rod.

Figure 2 is an elevation of an assembly embodying my invention, the same being shown as employed for connecting a guy wire to an anchor rod, the end portions alone of the wire and rod being here shown, and the wedge shaped sheave block being shown in its retracted position as in the act of tightening or loosening the guy wire.

Figure 3 is a view similar to that of Figure 2, except that the sheave block is here shown as fully seated in its socket, thus locking the guy wire in its adjusted position.

Figure 4 is a longitudinal section on the line 4—4 of Figure 2.

Figure 5 is a longitudinal section on the line 5—5 of Figure 3.

Figure 6 is a longitudinal section through the end of the frame embodying the sheave socket, the opposite end of the frame being broken off.

Figure 7 is a side elevation of the wedge shaped sheave block and pulley, a guy wire being shown as mounted thereupon.

Figure 8 is a longitudinal section through the end of the frame carrying the anchor rod engaging elements, an end of an anchor rod being shown as supported in place. A form of rotatable nut carrying sleeve is here projecting exteriorly at the end of the frame as means for turning the nut.

Figure 9 is a top plan view of the anchor rod engaging elements as shown in Figure 8, the same being removed from the frame.

Figure 10 is a side elevation of a modified form of anchor rod engaging element adapted for use in combination with the connecting frame. The nut carrying sleeve shown in the assembly of Figure 8 is here omitted, the nut supporting the end of the anchor bar being shown as extended exteriorly at the end of the frame to facilitate the turning of the nut.

The elements of my invention include an open frame, cage or housing 1, one end thereof being formed to embody a tapered sleeve socket 2, the narrow or small end of the socket opening out axially through one end of the frame, as shown in Figure 6. This socket in cross section is elongated from side to side of the frame and is tapered only upon its two opposite and relatively narrow side walls 3 and these walls are also grooved to form parts of a cable-way. The remaining two and opposite side walls 4 are wider and lie parallel to each other. The inner face of one side of the frame is recessed to form a shoulder or sheave rest 5 and a groove 6 is extended from this recess longitudinally along the side wall through the socket to form a sheave guide way. A complimentary, flat, wedge-shaped sheave block 7 is provided, the same being adapted to fit into the said socket 2, and being grooved along its narrow sides, as shown at 8, to form parts of a cable way complemental to the grooved sides of the socket 2. The block 7 is recessed or cut out at its large end 9, between its parallel sides to provide spaced bearings 10 for receiving the grooved pulley 11, which is journaled upon a stub shaft 12 anchored at its ends in the said bearings 10. The block 7 is somewhat narrower across its flat dimension, than the width of the socket 2, whereby the block is permitted a degree of lateral play within the said socket, and a shoulder 13 and rib 14 are provided upon the block complemental to the sheave rest 5 and guide-way 6 of the frame and socket wall. The arrangement is such that when the block 7 is drawn back or out somewhat from its seat in the socket 2, it may be shifted laterally so that the shoulder 13 will ride upon the sheave rest 5 and the rib 14 will fall into the groove 6, whereby the block while so held will be prevented from fully seating in its socket 2. A threaded bore 15 is formed through the wall of the socket 2 oppositely to the sheave rest 5 and groove 6, and a thumb or set screw 16 is removably fitted to this bore, and by turning this screw in against the block 7, it will then be locked in its said retracted position, by virtue of the shoulder 13 engaging the sheave rest 5 as aforesaid. However, by merely loosening or removing the screw 16, the block 7 may be readily moved out laterally and allowed to fully seat within the socket 2. The pulley 11 is so dimensioned and positioned between the bearings 10 that the extended edge lines along the grooved sides of the wedge-shaped sheave block 7 will lie tangent to the corresponding peripheral portions of the pulley, and so that the latter will constitute substantially a symmetrically enlarged continuation of the sheave block.

By this arrangement and alignment of the pulley 11, the cable or guy wire 17 may be passed straightly through the said cable ways formed by the grooving of the socket walls and block 7 as described and over the pulley 11, may be loosened by retracting the block 7 and may be pulled taut over the pulley by locking the block 7 in its retracted position with the screw 16. The cable may then be quickly locked in its drawn position by releasing the screw 16 and allowing the block 7 to seat within its socket 2, the cable being locked by being pinched between the tapered block 7 and the adjacent tapered walls 3 of the socket 2. By extending the socket walls 3 back over the outer peripheral points of the pulley 11, as shown at 18, the said pulley also locks against rotation as the block 7 seats in the socket 2, thereby increasing the effective frictional locking of the cable 17.

An anchor rod aperture 20 is formed axially through the opposite end of the frame 1 for receiving the upper threaded end 21 of the anchor rod 22, which is ordinarily held in the ground by means of an anchor 23. This aperture 20 is substantially larger than the diameter of the rod 22 so as to provide a clearance or sleeve-way 24 between the rod and the margins of the aperture, and through this sleeve way is seated a rod engaging element 25, which in Figure 8, is shown in the form of a rotatable sleeve 26 mounted over the end of the rod and having an integrally formed enlarged head 27 at its inner end, with upturned ribs 28 which are adapted to impinge upon the nut 29 mounted upon the inner end of the rod 22 and to turn said nut with the sleeve 26, as the latter is rotated. The exterior end of the sleeve 26 is formed with two or more wrench engaging faces 30, whereby the sleeve may be readily turned for the purpose of tightening or loosening the nut 29. As shown in Figure 10, the element 26 of Figure 8 threadedly engages the rod 21, and the head 27 having a bearing upon the inner faces of the margins of the aperture 20, takes the place of the separate nut 29, which is, therefore, dispensed with in this structure.

In use the devices described cooperate to the quick adjustment and tightening of the cable or guy wire 17, either in new installations or in repair work. In new installations, the guy wire may be easily and quickly drawn taut over the pulley, and then frictionally locked, in manner already described, after which the wire may be further tightened by turning the sleeve 26 with a wrench.

In repair work as for drawing taut a wire which has become relaxed owing to the action of frost, all that is needed is the use of the wrench upon the sleeve 26.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device of the kind described, a frame embodying at one end a tapered sheave socket opening out through the end, a complemental, wedge shaped sheave block fitted to the said socket, the said block being recessed at its larger end so as to provide spaced bearings, a pulley journaled between the said bearings, the opposite end of the frame being apertured for engaging the threaded end of an anchor rod having a nut thereupon, the said aperture being substantially larger than the diameter of the rod to provide a sleeveway between the rod and the margins of the aperture, a sleeve rotatably mounted through said sleeve way and having an enlarged head for supporting the nut within the end of the frame, the outer end of the sleeve being faced for engaging a wrench.

2. In a device of the kind described, a frame embodying at one end a sheave socket tapering to and opening out through the end, a shoulder formed upon one side wall of the socket, a complemental wedge-shaped sheave block fitted to the said socket and adapted for some degree of lateral movement therein, a shoulder formed upon one side of the sheave block adapted to engage the said shoulder of the socket wall for releasably holding the sheave block in a retracted position relative to its seat, means for releasably holding the two said shoulders in such interlocked relation, a pulley journaled at the larger end of the sheave block, the same being so dimensioned and positioned as to constitute a symmetrically enlarged continuation of the block, and means at the opposite end of the said frame for adjustably engaging an anchor rod.

3. In a device of the kind described, a frame having at one end a rod receiving aperture, a threaded rod and nut passed therethrough, the said rod being substantially less in diameter than the diameter of the aperture, thereby providing a sleeve way, a sleeve rotatably mounted over the end of the rod and extended through said sleeve way, the said sleeve having an integrally formed head adapted to bear upon the margins of the said aperture, the said head having marginal upstanding ribs adapted to engage the said nut, means at the opposite extended end of the sleeve for facilitating its rotation, and means at the opposite end of the frame for adjustably engaging a guy wire.

4. In a device of the kind described, a frame embodying at one end a sheave socket tapering to and opening out through the end, a shoulder formed upon one side wall of the socket, a complemental wedge-shaped sheave block fitted to the said socket and adapted for some degree of lateral movement therein, a shoulder formed upon one side of the sheave block adapted to engage the said shoulder of the socket wall for releasably holding the sheave block in a retracted position relative to its seat, means for releasably holding the two said shoulders in such interlocked relation, a pulley journaled at the larger end of the sheave block, the same being so dimensioned and positioned as to constitute a symmetrically enlarged continuation of the block.

5. In a device of the kind described, a frame having a tapered sheave socket having its tapered end opening out through the frame, the socket being tapered only upon two opposite walls, the other two opposite walls lying substantially parallel, there being a shoulder formed upon one of the parallel walls of the socket, the opposite parallel wall having a threaded bore formed therethrough, a set screw removably fitted to the said threaded bore, a wedge-shaped sheave block loosely fitted to the said socket of the frame, there being a shoulder formed upon one side of the block for engaging the said shoulder of the socket when the block is somewhat retracted from its position of complete seating within the socket, and a pulley journaled at the larger end of the sheave block, the same being so dimensioned and positioned as to constitute substantially a symmetrically enlarged continuation of the block, whereby when the block is retracted from its seat in the socket, the pulley may function to facilitate the travel of a cable passing through the assembly, and when the block is fully seated, the pulley will cooperate with the block to frictionally bind the cable against the opposing socket walls.

6. In a device of the kind described, a frame having a tapered sheave block socket formed therein, a wedge-shaped sheave block positioned in said socket, and a pulley journalled in the larger end of the sheave block.

7. In a device of the kind described, a frame having a tapered sheave block socket formed therein, a complemental wedge-shaped sheave block positioned in said socket, a pulley journaled in the large end of the sheave block, and a cable passed through the said socket and over the pulley, the arrangement being such that when the sheave block and pulley are fully seated in said socket the pulley and cable will be frictionally locked against movement, but will be released for movement upon the partial retraction of the sheave block and pulley.

8. In a device of the kind described, a frame having a tapered sheave block socket formed therein, a complemental wedge-shaped sheave block positioned in said socket, a pulley journaled in the large end of the sheave block for engaging a cable passed through the said socket, the arrangement being such that when the sheave block and pulley are fully seated in said socket, the pulley and cable will be frictionally locked against movement, but will be released for movement upon the partial retraction of the sheave block and pulley.

In testimony whereof, I affix my signature.

JASPER BLACKBURN.